United States Patent [19]

Smith

[11] Patent Number: 5,083,540
[45] Date of Patent: Jan. 28, 1992

[54] ROTARY ENGINE

[76] Inventor: Thomas A. Smith, Purvis-Baxterville Rd., Purvis, Miss. 39475

[21] Appl. No.: 597,821

[22] Filed: Oct. 15, 1990

Related U.S. Application Data

[63] Continuation-in-part of Ser. No. 301,447, Jan. 25, 1989, abandoned.

[51] Int. Cl.⁵ .............................................. F02B 53/08
[52] U.S. Cl. .................................... 123/212; 123/234; 418/37
[58] Field of Search ............... 123/212, 213, 234, 245; 418/33, 34, 35, 36, 37, 38

[56] References Cited

U.S. PATENT DOCUMENTS

| | | | |
|---|---|---|---|
| 1,275,619 | 8/1918 | Smiley | 123/212 |
| 1,367,591 | 2/1921 | Duncombe | 123/245 X |
| 2,155,249 | 4/1939 | Bancroft | 123/234 X |
| 2,367,676 | 1/1945 | Griffith | 123/234 |
| 3,550,563 | 12/1970 | Smith | 418/37 |
| 3,989,012 | 11/1976 | Doundoulakis | 123/245 X |
| 4,437,441 | 3/1984 | Menioux | 123/245 X |

Primary Examiner—Michael Koczo

[57] ABSTRACT

This invention relates to improvements on rotary engines having annular cylinders, each having at least two pistons drivable in rotation therein, the pistons being fixed respectively to concentric shafts that are thereby independently rotated around their concentric axis. Each of the concentric shafts extends through all the cylinders, which are formed by rotatable discs within an annular master cylinder. The concentric shafts are supported for rotation by bearings mounted within the end housings of the annular master cylinder with each of the concentric shafts having an end extending through one of the end housings for connecting to means for independently coupling the two concentric shafts to a common eccentric shaft.

10 Claims, 4 Drawing Sheets

ROTARY ENGINE

This application is a continuation-in-part of application Ser. No. 301,447 filed on Jan. 25, 1989, now abandoned.

The invention is an improvement on rotary engines of the type where the pistons are controlled by a shaft with an axis eccentric to that of the rotating pistons. My engine of U.S. Pat. No. 3,550,563 is one of the best examples of this type engine known to me. This application includes the method of coupling the eccentric shaft to the concentric shafts which is covered by said patent above, therefore it is excluded from any claims covered by this application. These excluded parts are all inclosed within the housing number 25 of FIG. 1 of this application.

It is an object of this invention to provide a rotary unit that is adaptable for use as an internal combustion engine, a sterling type engine, without the necessity of using displacement pistons, a steam engine, or an air motor with changes only in the ports required.

Another object of this invention is to provide an annular master cylinder enclosing a multiple cylinder rotary engine having the pistons and the concentric shafts supported by the end housings of the annular master cylinder by low friction means.

A further object of this invention is to provide ports through the housing enclosing the annular master cylinder for access to the outside for intake and output of the gases for each cylinder.

A further object of this invention is to provide an internal combustion engine with a port in the annular master cylinder for passing a compressed fuel mixture from the discharge ports of the intake and compression cylinders into a combustion cylinder with means for igniting the fuel mixture within the cylinder. The combustion cylinder has a port to exhaust the burned fuel from the combustion cylinder.

Another object of the invention is to provide mean to prevent hot escaping gases from the combustion cylinder from reaching the compression cylinders.

Another object of the invention is to provide an engine with slower seal speed.

Another object of the invention is to provide means to get perfect diametrical balance for all rotating members.

DESCRIPTION OF THE PREFERRED EMBODIMENTS

This invention is an improved cylinder for my engine U.S. Pat. No. 3,550,563.

I would like to incorporate the piston controlling means of said U.S. Pat. No. 3,550,563 into this specification for reference only.

I will show a preferred embodiment of this invention, having an annular master cylinder composed of a cylindrical housing, a hollow concentric shaft, an outward end housing and an inward end housing with multiple annular cylinders within the annular master cylinder. The inward end housing being the end enclosed within the housing 25 and the outward end housing being the end that is opposite said housing. Using the unit as a four cycle internal combustion engine, the centrally located cylinder C1 is used for the explosion and exhaust and cylinders C3 and C5 are used for intake and compression of a fuel air mixture which is transfered through ports and passages to the power cylinder C1. Each cylinder has similar ports which are opened and closed by their relative pistons thereby eliminating the need for valves. Cylinders C2 and C4 are used for air cooling the combustion cylinder C1. These cylinders C2 and C4 act as a buffer zone to prevent burning or hot leaking gases from reaching the compressed fuel mixture in the cylinders C3 and C5. Cylinders C3 and C5 are also cooled by the pumping action of the pistons within the two cylinders C2 and C4. This allows higher compression of the fuel mixture.

Figure 1:
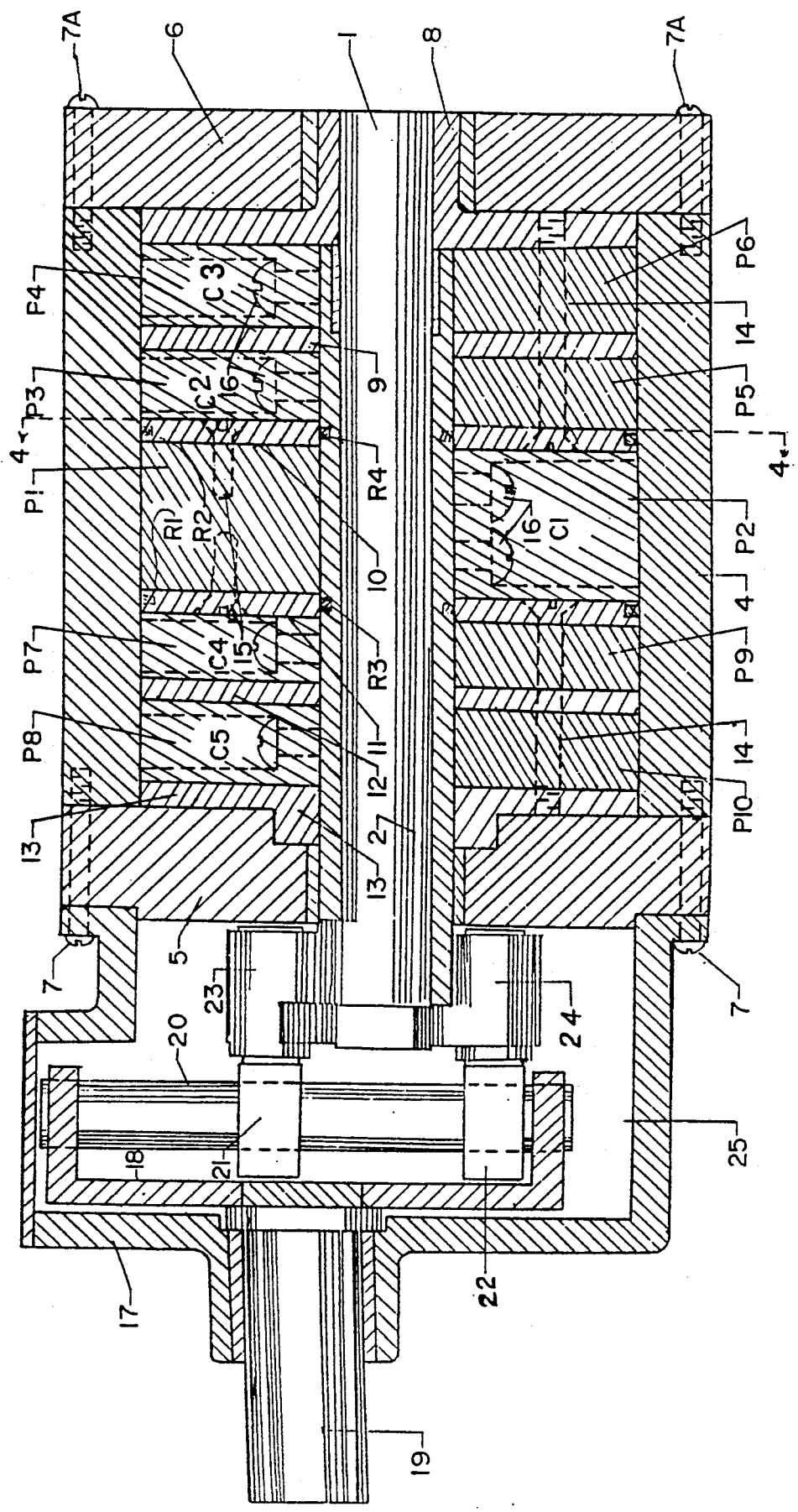
FIG. 1 is a side view, partially sectioned, of the engine showing the improved cylinder with multiple cylinders therein.

Referring to FIG. 1, the inner concentric shaft 1 extend through the annular master cylinder and is rigidly connected to and supported by a hub on disc 8. This disc is mounted for rotation in the outward end housing 6. The other end of said inner concentric shaft 1 extend through the inward end housing 5, thereby being available for connection to a cranklike member. The hollow concentric shaft 2 likewise extend through the annular cylinders and the outward end of concentric shaft 2 is supported for rotation by the inner concentric shaft 1. One end of concentric shaft 2 has sealing contact with disc 8. The other end of the hollow concentric shaft extend through and is supported for rotation by the inward end housing 5 and is also available for connection to a cranklike member. The housings 4, 5 and 6 define, in cooperation with the hollow concentric shaft 2, an annular master cylinder which is divided into five independent cylinders by discs 8, 9, 10, 11, 12 and 13. Disc 8 has pistons P5 and P6 and discs 9 and 10 rigidly connected to them with machine screws 14. The disc 10 is likewise connected to piston P1 with machine screws 15. The other side of the piston P1 is likewise connected to disc 11 with machine screws 15. The placement of piston P1 is rotated 180 degrees from the position of pistons P5 and P6 on the disc 10. The disc 11 has pistons P9, P10 and discs 12 and 13 connected with machine screws 14. Pistons P9 and P10 are rotated 180 degrees from piston P1 on disc 11. This means of connecting pistons P1, P5, P6, P9 and P10 and discs 8 through 13 holds them in a fixed position in relation to each other and the inner concentric shaft 1. Piston P2 is rigidly connected to the hollow concentric shaft 2 in cylinder C1 by machine screws 16. Piston P3 is rotated on the hollow concentric shaft 2 180 degrees where it is rigidly connected to said hollow concentric shaft in cylinder C2 by machine screws 16. Piston P4 is likewise connected to said concentric shaft 2 in cylinder C3. The piston P7 is likewise connected to said hollow concentric shaft 2 in cylinder C4 and is in alignment with pistons P3 and P4. Piston P8 is likewise connected to said hollow concentric shaft 2 in cylinder C5.

Housing 17 is rigidly connected to inward housing 5 by machine screws 7, enclosing a reservoir for a lubricant and also enclosing the means for connecting the concentric shafts 1 and 2 to the eccentric shaft 19. These machine screws also rigidly connect the inward end housing 5 to the housing 4. Machine screws 7a rigidly connect the outward end housing 6 to the housing 4. The eccentric shaft 19 is mounted for rotation in the housing 17 eccentric to shafts 1 and 2 with its axis parallel to the axis of shafts 1 and 2 and extends outside housing 17 for connecting to means for driving or being driven. Shaft 19 has a flywheel 18 rigidly connected within the housing 17. Flywheel 18 has a flanged edge for rigidly connecting a round bar 20 diametrically across the axis of the flywheel and the eccentric shaft 19.

Figure 2:
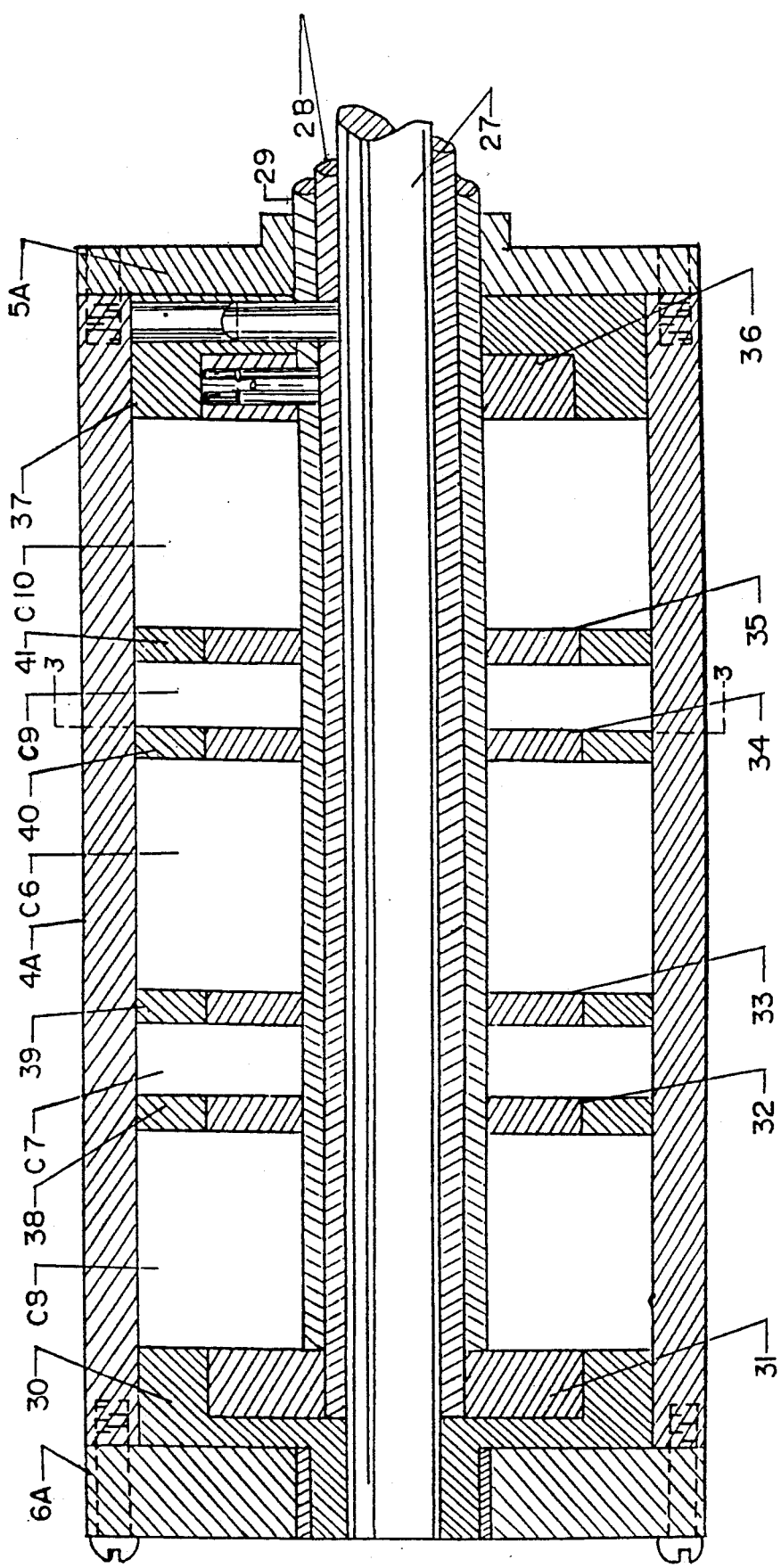
FIG. 2 is a similar view of a three piston per cylinder species of the invention with the pistons removed.

The bushed member 21 has slidable connection with bar 20 allowing it to move toward and away from the axis of the eccentric shaft 19 as the shaft is rotated. The member 21 is mounted for rotation to the cranklike member 23. The bushed member 22 is likewise connected to the bar 20 and to the cranklike member 24. When the member 22 reaches the position shown FIG. 1, it will reach its maximum rotational speed. With 180 degrees rotation of the eccentric shaft 19 cranklike member 23 and the member 21 will exchange positions with cranklike member 24 and member 22. This exchange of positions happens every revolution of the eccentric shaft 19. Cranklike member 24 is in radial alignment with the center of pistons P5,P6,P9 and P10. Cranklike member 23 is likewise aligned with pistons P3, P4, P7 and P8. This invention is shown in FIGS. 1 and 2 with the cylindrical housings 4 and 4a being continuous, but it is obvious that each could be made in segments and fastened together with machine bolts and in combination with the concentric shafts form the annular master cylinder. FIGS. 1 and 2 show the invention with 5 cylinders within the annular master cylinder, but it should be obvious that other pistons and cylinders could be added within the scope of this invention and still keep the dynamic balance.

The ring seals R1, R2, R3 and R4 shown on discs 10 and 11 in FIG. 1 could be used on these and the other discs for better prevention of the gases escaping from one cylinder to the other. Like seals could be used on the three piston per cylinder type engine shown FIG. 2 of this application.

The relative volume of the cylinders, to each of the other cylinders, can be adapted for each use.

This invention can also be used as a stirling type engine, an air motor, a multi-stage compressor, or a compound steam engine.

Referring to FIG. 2, the concentric shaft 27 extends through the annular cylinders and is rigidly connected to and supported by a hub on disc 30. This disc is mounted for rotation in the end housing 6a. The other end of the concentric shaft 27 extends through the end housing 5a thereby being available for connection to a cranklike member. The hollow concentric shaft 28 likewise extends through the annular cylinders and is supported for rotation by concentric shaft 27. One end of the hollow concentric shaft has sealing contact with disc 30. The other end of the hollow concentric shaft extends through the end housing 5a and is also available for connecting to a cranklike member. The hollow concentric shaft 29 also extends through the annular cylinders and has sealing contact with disc 31.

The housings 4a, 5a and 6a define, in cooperation with the hollow concentric shaft 29, an annular master cylinder which is divided into five independent cylinders by discs 30 through 41. These cylinders C6,C7,C8, C9 and C10 each have the pistons mounted for independent rotation within. One piston in each cylinder is rigidly connected to the hollow concentric shaft 29. One piston in each cylinder is connected to discs 31, 32, 33, 34, 35 and 36. One piston in each cylinder is rigidly connected to discs 30, 37, 38, 39, 40 and 41. These pistons are connected to the discs by machine screws as shown and described in the two piston in each cylinder type of FIG. 1. Discs 30 and 37 support and rotate the pistons connected to discs 38, 39, 40 and 41. Discs 31 and 36 support and rotate the pistons connected to discs 32, 33, 34 and 35. Concentric shaft 29 supports and rotates one piston in each cylinder. Disc 37 is shown with a shoulder bolt passing through elongated holes 28 and 29 . The shoulder bolt screws into a threaded hole in the concentric shaft 27. Disc 36 is shown with shoulder bolt passing through an elongated hole in the hollow concentric shaft 28. These shoulder bolts prevent any twisting out of alignment of the pistons and discs. The phasing of the pistons in the three piston in each cylinder model, shown in FIG. 2, requires only an additional crank assembly similar to the one shown and described in the two piston per cylinder model, and instead of the bar 20, flywheel 18 would have three equally spaced short bars terminating at the axis of the eccentric shaft 19. With the rotation of the eccentric shaft 19 and with the three bushed members having slidable connection with the short bars and being free to slide toward and away from the axis of the eccentric shaft, the pistons would, while moving forward, have variable annular speed that is necessary for changing the volume in the cylinders of this type of engine.

The three pistons in each of the cylinders are omitted to better show the the sealing relation-ship between the inner and the outer discs that form, in cooperation with the hollow concentric shaft 29, the separate cylinders within the annular master cylinder of this engine.

Figure 3:
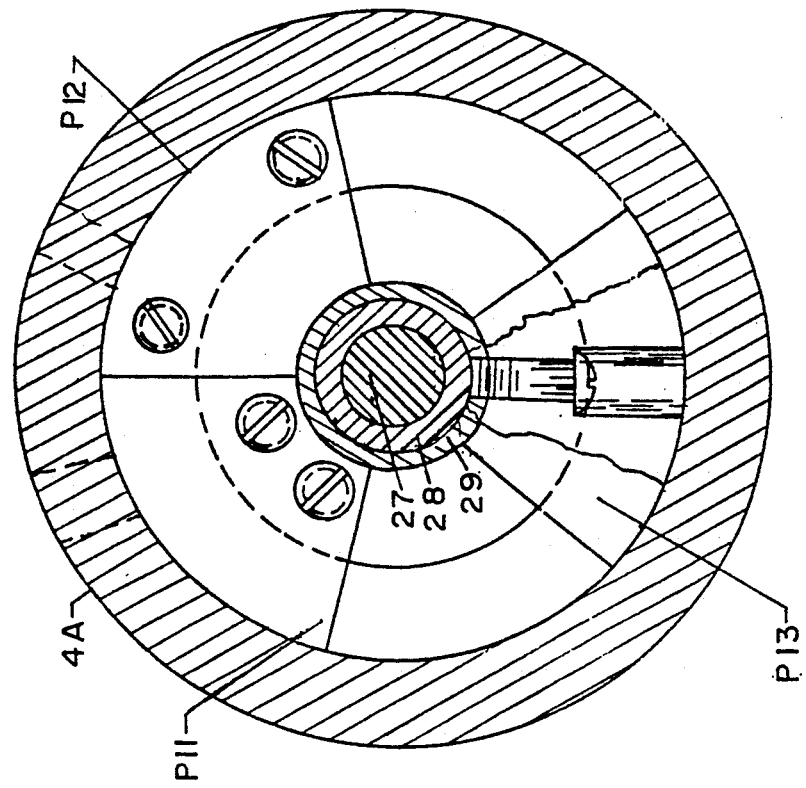
FIG. 3 is a cross-sectional view taken along section line 3—3 of FIG. 2 showing the pistons connected to the discs by machine bolts similar to the two piston per cylinder specie shown FIG. 1.

FIG. 3 shows an end view of the engine of FIG. 2 taken along section line 3—3, showing how each of the three pistons are rigidly connected to the discs and the hollow concentric shaft 29. The discs are shown as being transparent to better show the rigid connection of the discs and their respective pistons.

Figure 4:
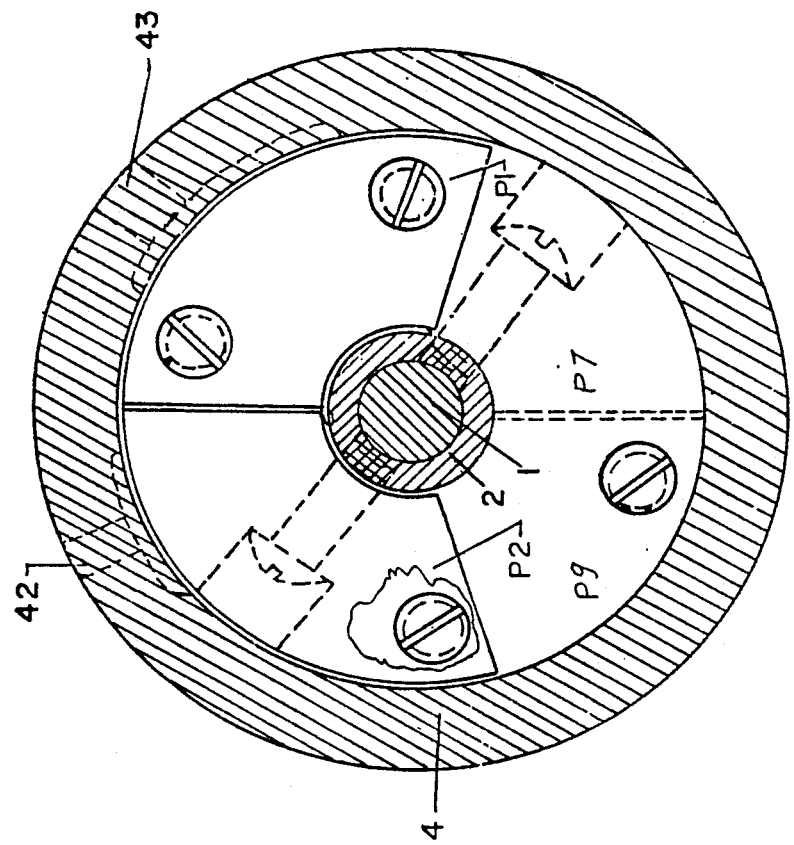
FIG. 4 is a similar view taken along line 4—4 of FIG. 1.

FIG. 4 shows an end view of the engine of FIG. 1, taken along section line 4—4, showing how the two pistons are rigidly connected to the discs and the hollow concentric shaft 2. The discs are also shown as being transparent to better show the bolts for connecting each of the pistons to the discs and the hollow concentric shaft.

FIG. 4 also shows intake port 42 and exhaust port 43. Similar ports are required for each of the cylinders of the engine shown in FIGS. 1 and 2 of this application. The ports 42 and 43 are opened and closed by the pistons as they rotate to allow intake and exhaust at the proper time.

Figure 5:
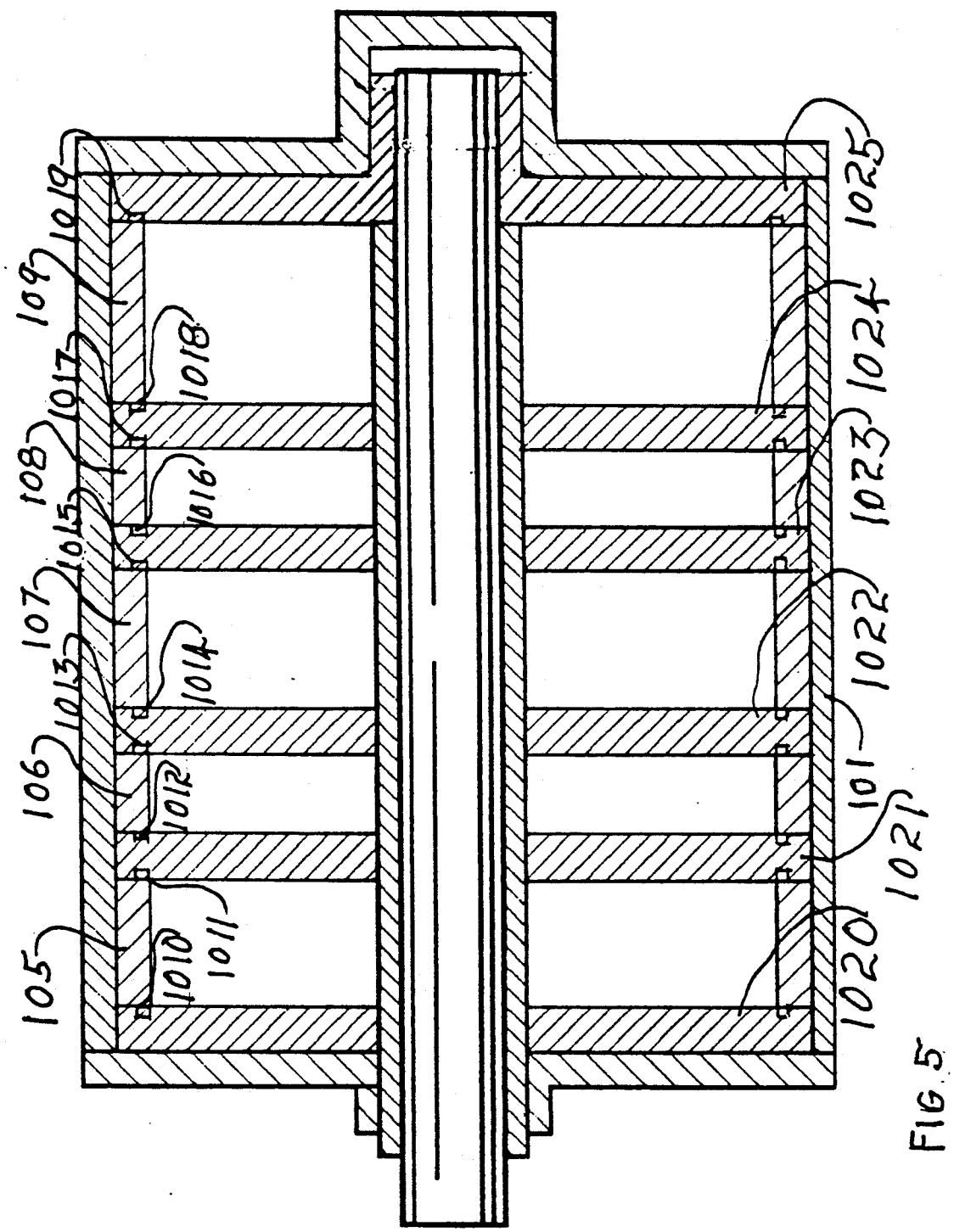
FIG. 5 is a side view, partially sectioned, of the improved cylinder showing the addition of collars in each of the cylinders to improve the sealing between the disc and the outer housing.

Referring to FIG. 5 the collars 105, 106, 107, 108 and 109 are securely connected to the outer housing 101. Ring seals 1010, 1011, 1012, 1013, 1014, 1015., 1016, 1017, 1018 and 1019 have sealing contact with discs 1020, 1021, 1022, 1023 1024 and 1025. The pistons are not shown as they are connected and controlled as described in the specification of my former application. in the end housings of the annular master cylinders of FIGS. 1 and 2. The other one half of said total mass is likewise connected, equal distance from said bearing supports, but is rotated 180 degrees from the other one half of said total mass.

The pistons and discs of the engines shown FIG. 1, 2, 3, and 4 and described above show the assembly of pistons and discs as being separate and being rigidly connected by machine bolts, but they could be machined from one piece of material to conform to the shape of the assembly of pistons and discs shown for each of the engines shown in the drawings.

What is claimed is:

1. An improved rotary engine comprising an annular master cylinder composed of a cylindrical housing, a continuous hollow outer concentric shaft, an outward end housing and an inward end housing;
   a. means to form a dynamically balanced disc piston assembly extending from the said outward end housing to the said inward end housing thereby dividing the said annular master cylinder into at least three separate gas tight cylinders formed by rotating discs, each cylinder having at least two pistons independently rotatable therein;
   b. means to isolate the unexpanded gases from any exit path into the housing of the piston controlling means; and
   c. wherein one of said pistons in each cylinder is connected directly to the said continuous outer concentric shaft to form a first piston assembly, the other of said pistons in each cylinder is connected to said discs which are connected to the end of an inner concentric shaft to form a second piston assembly, means for controlling the piston action by a common eccentric shaft such that as the pistons rotate they expand and reduce the distance between them thereby changing the volume between the pistons within each of the cylinders.

2. The engine of claim 1 wherein the continuous concentric shafts extending through the multiple cylinders are supported for annular master cylinder, with means for connecting each of the said concentric shafts to a shaft mounted eccentric to them for driving or for being driven by the rotation of the engine.

3. The engine of claim 1 wherein one of the said continuous concentric shafts passes through the cylinders within the other concentric shaft and being connected to a disc, the hub of said disc being rotatably mounted in the outward end housing of the annular master cylinder, said disc being the means to support said concentric shafts.

4. The engine of claim 1 wherein the mounted end disc is coupled to the second piston assembly, therefore being a means to connect the pistons and discs of the second piston assembly to the said inner concentric shaft to avoid a leakage path from the high pressure cylinders to the means of controlling and rotating the concentric shafts.

5. The engine of claim 1 wherein the means for rigidly connecting the series of pistons and disc forms a dynamically balanced rotatable member to compose the plurality of annular cylinders within the annular master cylinder.

6. The engine of claim 1 wherein the means for isolating the unexpanded gases from any exit path includes a cylinder centrally located between the inward and outward end housings for the primary power impulse with similar companion cylinders on each side for intaking and compressing the air and fuel mixture with means to transfer said mixture to the centrally located primary power cylinder for ignition by electrical means.

7. The engine of claim 6 wherein the centrally located primary power cylinder has similar adjacent cylinders on each side for isolating said primary power cylinder from the other cylinders to prevent hot gases from reaching the compressed fuel in the compression cylinders.

8. The engine of dependent claim 6 wherein the adjacent cylinders have two pistons rotating independently within to air cool the cylinders.

9. The engine of claim 1 having means to connect to its respective concentric shafts, one half of the combined mass of the piston assemblies being rotated by each of the concentric shafts, the center of the mass of each of the piston assemblies being an equal distance from each of the bearing supports in the inward and outward end housings and the other one half of the combined mass being connected to and rotated 180 degrees from the other one half of said mass thereby dynamically balancing the mass rotated by each of the concentric shafts.

ring seals

10. The engine of claim 1 wherein the discs have ring seals mounted on each side and, in combination with collars installed within each of the cylinders, seal the corners of the rectangular cylinders.

* * * * *